Feb. 8, 1938. J. BURTON 2,107,407

SCAFFOLDING COUPLING

Filed June 4, 1935

INVENTOR:
JOHN BURTON
BY: Rieze + Boyce
ATTORNEYS

Patented Feb. 8, 1938

2,107,407

UNITED STATES PATENT OFFICE 2,107,407

SCAFFOLDING COUPLING

John Burton, Edgbaston, Birmingham, England

Application June 4, 1935, Serial No. 24,884
In Great Britain June 6, 1934

8 Claims. (Cl. 189—36)

This invention relates to scaffolding couplings and refers more particularly to that type of coupling which is adapted to secure together two scaffolding members which may be formed as metal tubes, and which are arranged transversely to one another. The coupling may, for instance, be used for coupling a ledger to a standard, but it is primarily intended for use as a putlog clip, i. e. for securing a putlog to a ledger.

The object of the present invention is to provide a generally improved construction which will allow of the boards being placed upon the upper surface of the putlog without the clip forming an obstruction; which will allow of the putlog being placed in the clip with a sideways or downward movement as distinct from an endwise movement; which can be tightened up with a single nut or screw, and which will have no loose parts. Further, the construction allows of the clip to be placed on the ledger and the putlog being placed in position afterwards, and in its preferred form it provides greater security against angular displacement of the scaffolding members than hitherto.

Referring to the drawing:—

Figure 1:
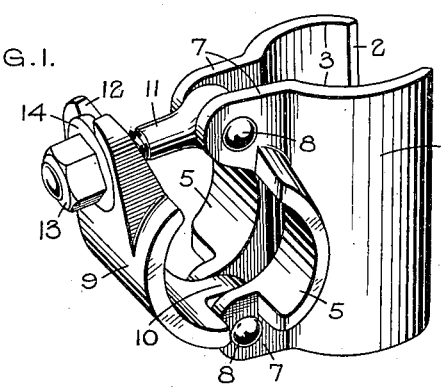
Figure 1 is a perspective view showing one embodiment of the invention.
Figure 2:
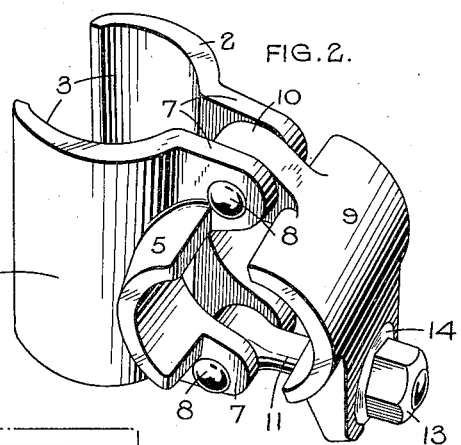
Figure 2 is a perspective view of the coupling shown in Figure 1, but looking from a different position.
Figure 3:
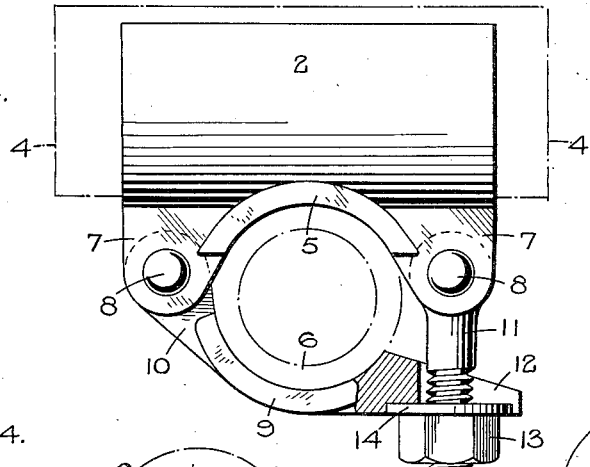
Figure 3 is a view in side elevation showing the coupling in its closed position connecting the two scaffolding members.
Figure 4:
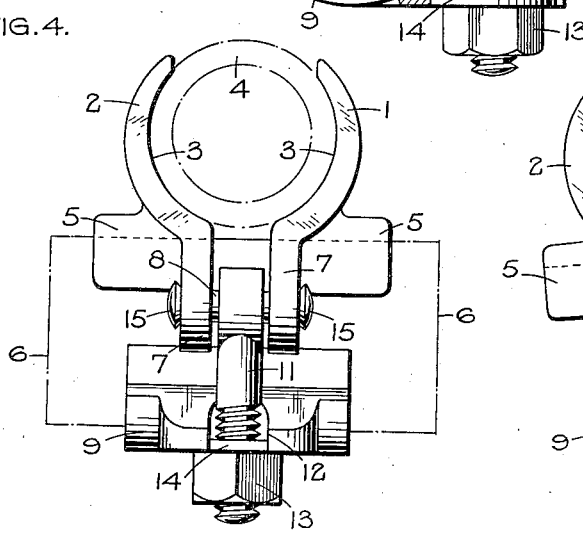
Figure 4 is a plan view showing the coupling in its closed position.
Figure 5:
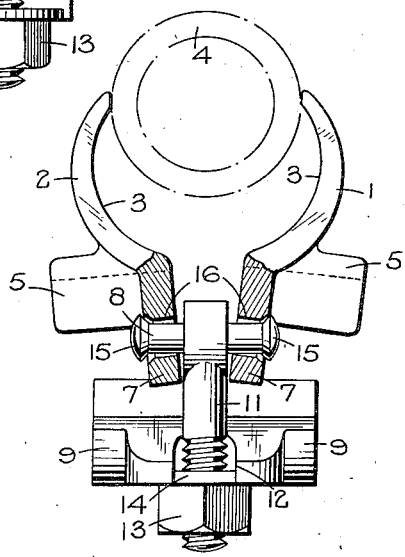
Figure 5 is a plan view showing the coupling in its open position.

In the construction illustrated, both the jaws 1, 2 of the one clamp are constructed with two arms or portions, and both are mounted so that they are capable of rocking movement relative to one another. One arm or portion 3 of each jaw is of part-cylindrical form for embracing the putlog or other scaffolding member 4, and the other arm or portion 5 of the jaw may also be of part-cylindrical form but arranged transversely to the first arm or portion. The second arm or portion 5 may bear upon the upper side of the ledger 6 and may partially embrace it.

The two jaws 1, 2, thus constructed may at their ends be provided with lugs 7 which are somewhat loosely connected together in spaced relationship by pins 8, and upon one of these pins the cap 9 of the second clamp is hinged.

The cap 9 is of part-cylindrical form and has a lug 10 at one end which is pivotally mounted upon one of the pins 8 connecting two of the lugs 7.

The pin 8 connecting the other two lugs 7 carries a screw 11 which is pivotally mounted upon the pin and arranged so that its free end can engage in a slot 12 at the free end of the cap 9, a nut 13 and washer 14 being provided so that pressure can be applied to the cap thereby.

The pins 8 connecting the two pairs of lugs 7 extend through clearance holes 16 in the lugs and are provided with heads 15 at their outer ends so that the jaws 1, 2, are able to make an inward or outward rocking movement about axes which are parallel to the axis of the scaffolding member embraced by the jaws.

In operation the clip is mounted upon a scaffolding member 6 such as a ledger by placing the cap beneath the ledger and placing the jaws 1, 2, in position so that one arm 5 of each bears at its outer end upon the upper surface of the ledger. When in this position before the nut 13 is tightened, the two jaws 1, 2, can be moved apart so as to allow the putlog 4 to be placed in position by a downward or sideways movement. When the putlog is in position, the nut 13 is tightened causing the cap to grip the ledger or other scaffolding member 6, and causing the two jaws to make a rocking movement inwardly so that they grip the putlog 4 or other scaffolding member.

The gripping parts of the jaws 1, 2, terminate short of the top of the putlog so as to allow the boards to be laid flush.

The pivotal or rocking movement of the two jaws takes place about the outer ends of the two arms 5 where they bear upon the supporting scaffolding member 6.

Those parts of the coupling which engage the adjacent surfaces of the two scaffolding members to be attached together are preferably of part-cylindrical form so as partially to embrace the scaffolding members. This construction provides security against angular displacement of the two scaffolding members in relation to one another, i. e. the scaffolding members are held at a definite angle to one another.

The two jaws and the cap are preferably designed so that they can be produced conveniently by drop forging, and the outer surface of the cap adjacent the slot which is engaged by the screw may be provided with a circular recess 16 for receiving the washer.

If desired, only one of the portions 3 need embrace partially the member 4 and the other may merely engage it over a small circumferential distance.

Instead of mounting the screw 11 pivotally upon one of the pins 8, the said pin may be provided with a screw threaded hole, and a screw may be mounted in a hole in the cap 9, the inner end of the screw being adapted to enter the threaded hole in the said pin 8.

What I claim then is:—

1. A scaffolding clamp for securing together two scaffolding members in transverse relationship comprising in combination, a pair of jaws, said jaws having each a portion adapted for clamping engagement with one of the scaffolding members on opposite sides thereof, one at least of said portions being adapted partially to embrace said scaffolding member, said jaws having each a pair of openings arranged opposite to one another, the openings of each jaw being spaced longitudinally of said scaffolding member, pins disposed transversely of said scaffolding member extending loosely into said openings and connecting the jaws together, said jaws each having also an abutment part adapted for engagement with the other scaffolding member, one at least of said abutment parts extending transversely of said portions and outwardly away from said openings, a cap adapted to co-operate with said latter abutment part in gripping said other scaffolding member, said cap having one end thereof mounted on to one of said pins and associated pivotally with the jaws, securing means adapted to connect the free end of said cap releasably to said other pin, said securing means being adapted to draw said cap into clamping engagement with said other scaffolding member, and to apply pressure to said jaws adjacent said openings.

2. A scaffolding clamp for securing together two scaffolding members in transverse relationship comprising in combination, a pair of jaws, said jaws having each a portion adapted for clamping engagement with one of the scaffolding members on opposite sides thereof, one at least of said portions being adapted partially to embrace said scaffolding member, said jaws each having also an abutment part adapted for engagement with the other scaffolding member, said jaws having each a pair of lugs arranged opposite to one another and spaced longitudinally of said former scaffolding member, said lugs being disposed substantially between said abutment parts, the lugs having each an opening, pins disposed transversely of said former scaffolding member extending loosely into said openings and connecting the jaws together, a cap adapted to co-operate with one of the abutment parts in gripping said other scaffolding member, said cap having one end thereof extending between a pair of opposite lugs and hinged to one of said pins, a bolt extending between the other pair of opposite lugs and hinged to the remaining pin, said bolt having means for tightening said cap into engagement with the other scaffolding member, and said bolt and cap being adapted on tightening the latter to apply pressure to said pins to rock said jaw portions into clamping engagement with said first-mentioned scaffolding member.

3. A scaffolding clamp for securing together two scaffolding members in transverse relationship comprising in combination, a pair of jaws, said jaws having each a portion adapted to embrace partially and to grip one of the scaffolding members, said jaws each having also a further portion extending transversely and outwardly of said embracing portions, said further portions being adapted at their outer ends to engage the other scaffolding member, said jaws having each a pair of lugs arranged opposite to one another and spaced longitudinally of said former scaffolding member, said lugs being disposed substantially adjacent the junction of the two portions of each jaw, the lugs having each an opening, pins disposed transversely of said former scaffolding member extending loosely into said openings and connecting the jaws together, a cap adapted to co-operate with said further portions in gripping said other scaffolding member, said cap having one end thereof extending between a pair of opposite lugs hinged to one of said pins, a bolt extending between the other pair of opposite lugs and hinged to the remaining pin, said bolt having means for tightening said cap into engagement with the other scaffolding member, and said bolt and cap being adapted on tightening the latter to apply pressure to said pins.

4. A scaffolding clamp for securing together two scaffolding members in transverse relationship comprising in combination, a pair of jaws, said jaws having each a pair of portions arranged transversely of one another, one portion of each jaw being disposed opposite to another and adapted to embrace partially and grip one of the scaffolding members, the other portions extending outwardly away from each other and adapted to embrace partially the other scaffolding member, said other portions being adapted at their outer ends to engage said other scaffolding member, said jaws having each a pair of lugs arranged opposite to one another and disposed on either side of said outwardly extending portions, said lugs being disposed substantially adjacent the junction of the two portions of each jaw, the lugs having each an opening, pins disposed transversely of said former scaffolding member extending loosely through said openings, said pins having heads adapted to engage the outer sides of said lugs adjacent the openings, a cap adapted partially to embrace said other scaffolding member and arranged to co-operate with said outwardly extending portions in gripping said member, said cap having one end thereof extending between a pair of opposite lugs and hinged to one of said pins, said cap having at its free end a slot, a bolt extending between the other pair of opposite lugs and hinged to the remaining pin, said bolt being adapted to enter said slot and having means for tightening said cap into engagement with the other scaffolding member, and said bolt and cap being adapted on tightening the latter to apply pressure to said pins.

5. A scaffolding clamp for securing together two scaffolding members in transverse relationship comprising in combination, a pair of jaws, said jaws having each a portion adapted for clamping engagement with one of the scaffolding members on opposite sides thereof, one at least of said jaws being adapted partially to embrace said scaffolding member, means connecting the two jaws, said jaws each having also an abutment part adapted for engagement with the other scaffolding member, a cap adapted to co-operate with each of said abutment parts in gripping said other scaffolding member, said jaw connecting means being adapted to permit of said jaws each pivoting relative to said cap about an axis which is substantially parallel to the longitudinal axis of the scaffolding member which the jaw portions engage and of said jaw portions moving towards and away from each other, means adapted to secure said cap in clamping engagement with said other scaffolding member, and simultaneously to apply pressure to both of said jaws to pivot the latter relative to said cap about the said axis and bring said jaw portions towards each other into clamping engagement with said first mentioned scaffolding member.

6. A scaffolding clamp for securing together two scaffolding members in transverse relationship comprising in combination, a pair of jaws, said jaws having each a portion adapted to embrace partially and to grip one of the scaffolding members, means connecting the two jaws, said jaws each having also a further portion extending transversely and outwardly of said embracing portions, said further portions being adapted at their outer ends to engage the other scaffolding member, a cap adapted to co-operate with said further portions in gripping said other scaffolding member, said jaw connecting means being adapted to permit of said jaws each pivoting relative to said cap about an axis which is substantially parallel to the longitudinal axis of the scaffolding member which the jaw portions engage and of said embracing portions moving towards and away from each other, means adapted to secure said cap in clamping engagement with said other scaffolding member, and simultaneously to apply pressure to both of said jaws to pivot the latter relative to said cap about the said axis and bring said embracing portions towards each other into clamping engagement with said first mentioned scaffolding member.

7. A scaffolding member for securing together two scaffolding members in transverse relationship comprising in combination, a pair of jaws, said jaws having each a portion adapted to embrace partially and to grip one of the scaffolding members, means connecting the two jaws, the latter each having also an abutment part adapted for engagement with the other scaffolding member, a cap adapted to co-operate with each of said abutment parts in gripping said other scaffolding member, securing means adapted to apply pressure to said cap and secure said clamp in loose engagement with said other scaffolding member, said connecting means being adapted with the clamp in loose engagement with the other scaffolding member to permit of said jaw portions each pivoting relative to said cap about an axis which is transverse to the longitudinal axis of said other scaffolding member and of said portions moving away from each other to permit of the first mentioned scaffolding member being placed in position therebetween, said securing means being adapted also to apply additional pressure to said cap and draw it into clamping engagement with the said other scaffolding member and simultaneously to apply pressure to both of said jaws to pivot the latter relative to said cap about the said axis and bring said jaw portions towards each other into clamping engagement with said first mentioned scaffolding member.

8. A scaffolding clamp for securing together in transverse relationship two scaffolding members at least one of which is of circular form in cross section and adapted to support scaffolding planks, said clamp comprising in combination, a pair of jaws, said jaws having each a portion adapted for clamping engagement with opposite sides of said circular scaffolding member, one at least of said portions being of arcuate form and adapted partially to embrace said circular scaffolding member, means connecting the two jaws, said jaws each having also an abutment part adapted for engagement with the other scaffolding member, a cap adapted to co-operate with each of said abutment parts in gripping said other scaffolding member, said jaw connecting means being adapted to permit of said jaws each pivoting relative to said cap about an axis which is substantially parallel to the longitudinal axis of the scaffolding member which the jaw portions engage and of said jaw portions moving towards and away from each other, means adapted to secure said cap in clamping engagement with said other scaffolding member, and simultaneously to apply pressure to both of said jaws to pivot the latter relative to said cap about the said axis and bring said jaw portions towards each other into clamping engagement with said circular scaffolding member, and the free ends of said jaw portions being spaced a substantial distance apart when in clamping engagement with said circular scaffolding member and being adapted in such position to permit of the scaffolding planks resting on that part of the circular scaffolding member which is engaged by the jaws.

JOHN BURTON.